US012566875B2

(12) United States Patent
Radu et al.

(10) Patent No.: US 12,566,875 B2
(45) Date of Patent: Mar. 3, 2026

(54) ADVERSARIAL ATTACKS COMMON INTERFACE

(71) Applicant: CrowdStrike, Inc., Sunnyvale, CA (US)

(72) Inventors: Marian Radu, Bucharest (RO); Denis Rozimovschii, Iaşi (RO); Filip Munteanu, Bucharest (RO); Mihai Maganu, Stuttgart (DE)

(73) Assignee: CrowdStrike, Inc., Sunnyvale, CA (US)

( * ) Notice: Subject to any disclaimer, the term of this patent is extended or adjusted under 35 U.S.C. 154(b) by 287 days.

(21) Appl. No.: 18/125,635

(22) Filed: Mar. 23, 2023

(65) Prior Publication Data

US 2024/0320354 A1     Sep. 26, 2024

(51) Int. Cl.
  *G06F 21/00*      (2013.01)
  *G06F 21/56*      (2013.01)
  *G06F 21/62*      (2013.01)
  *H04L 9/00*       (2022.01)

(52) U.S. Cl.
  CPC ........ *G06F 21/6218* (2013.01); *G06F 21/568* (2013.01); *H04L 9/002* (2013.01)

(58) Field of Classification Search
  None
  See application file for complete search history.

(56) References Cited

U.S. PATENT DOCUMENTS 11,227,047 B1 *  1/2022  Vashisht ................. G06F 21/56
12,287,868 B2 *  4/2025  Liu ......................... G06F 21/74

2006/0224538 A1 *  10/2006  Forman ................... G06N 20/00
                                                    706/20
2016/0155069 A1 *   6/2016  Hoover ................... G06Q 30/06
                                                    706/12
2019/0215329 A1 *   7/2019  Levy ....................... G06N 20/00
2019/0260775 A1 *   8/2019  Bartos ................... G06F 21/564

(Continued)

OTHER PUBLICATIONS

Y. Lu and J. Li, "Generative Adversarial Network for Improving Deep Learning Based Malware Classification," 2019 Winter Simulation Conference (WSC), National Harbor, MD, USA, 2019, pp. 584-593, doi: 10.1109/WSC40007.2019.9004932. (Year: 2019).*

(Continued)

*Primary Examiner* — Jeffery L Williams
(74) *Attorney, Agent, or Firm* — Womble Bond Dickinson (US) LLP

(57) ABSTRACT

A system and method of adjusting a classifier to improve a performance of the classifier to detect a malicious file. The method includes receiving a request to process a target file. The method includes generating, based on a configuration file and the target file, one or more modified files and metadata associated with the one or more modified files. The method includes providing the one or more modified files to a classifier trained to generate an output indicating whether each of the one or more modified files is malicious or non-malicious. The method includes generating, based on the output and the metadata, performance data indicative of a performance of the classifier. The method includes adjusting, based on the performance data, parameters of the classifier to improve the performance of the classifier to detect a group of attacks on a computing environment.

18 Claims, 6 Drawing Sheets

(56)                    References Cited

U.S. PATENT DOCUMENTS

| | | | |
|---|---|---|---|
| 2021/0256351 A1* | 8/2021 | Cao ........................ | G06N 10/60 |
| 2022/0269949 A1* | 8/2022 | Scheideler ............. | G06F 21/56 |
| 2023/0205877 A1* | 6/2023 | Ulasen ................... | G06F 21/56 |
| | | | 726/23 |
| 2023/0342465 A1* | 10/2023 | Sevcenko ............. | G06F 21/565 |
| 2024/0320354 A1* | 9/2024 | Radu ..................... | G06F 21/568 |
| 2025/0165226 A1* | 5/2025 | Roper, Jr. ................ | G06F 8/30 |

OTHER PUBLICATIONS

Hernandez-Suarez, Aldo et al. "ReinforSec: An Automatic Generator of Synthetic Malware Samples and Denial-of-Service Attacks through Reinforcement Learning." Sensors (Basel, Switzerland) vol. 23,3 1231. Jan. 20, 2023, doi:10.3390/s23031231 (Year: 2023).*

* cited by examiner

Adversarial Attack Management (AAM) System 104 classifier output

Classifier 108 parameters 109

105 modified files input message parameter message

Generator Container 106

Generator 107a    Generator 107c    Generator 107e

Generator 107b    Generator 107d    Generator 107f attack metadata classifier performance data Communication Network 120

101 target file

103 config file

1. List of attacks

2. Attack Rules process request classifier performance data

Client Device(s) 102

400
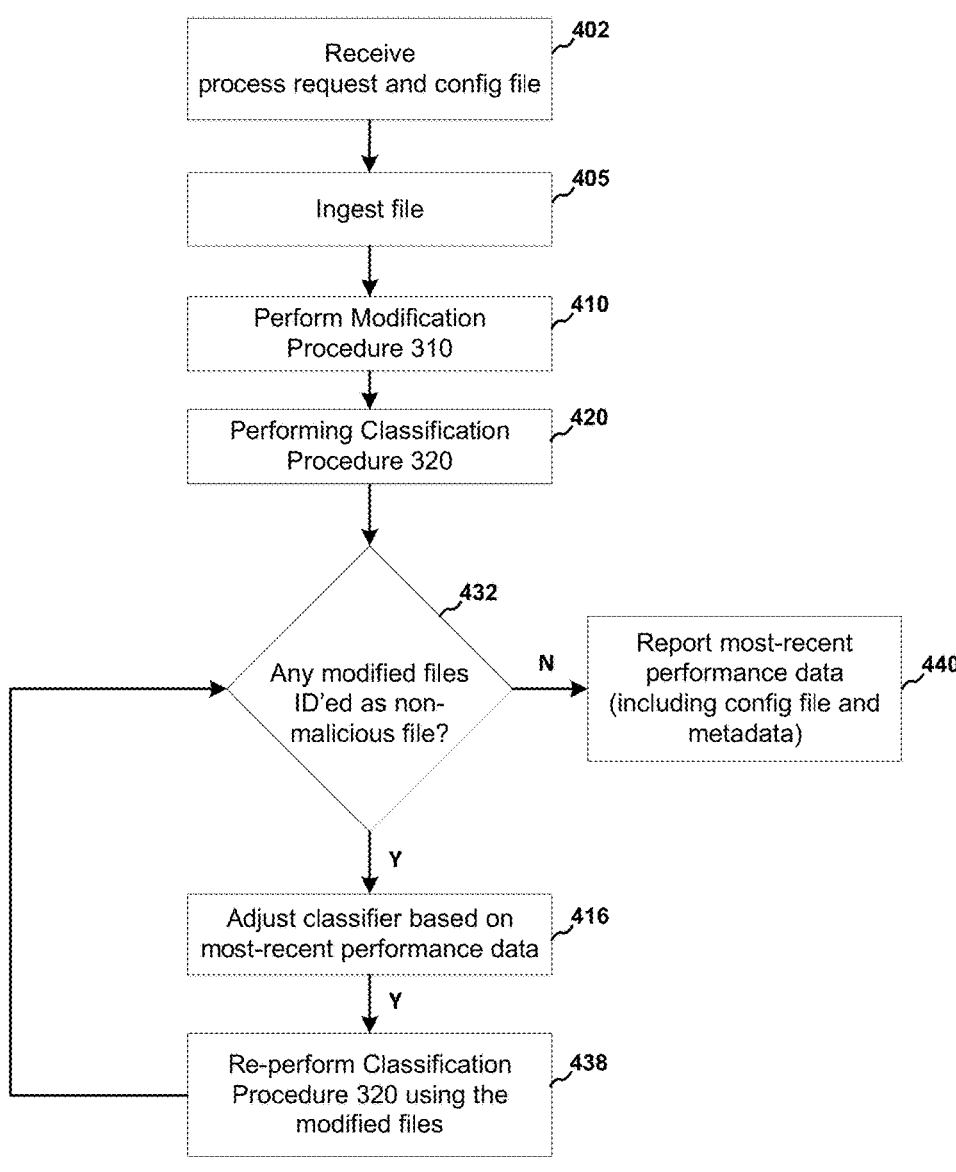
FIG. 4

500 receiving a request to process a target file
502 generating, by a processing device based on a configuration file and the target file, one or more modified files and metadata associated with the one or more modified files, wherein the one or more modified files are configured to perform a group of attacks on a computing environment, wherein each of the one or more modified files uniquely corresponds to one or more attacks of the group of attacks
504 providing the one or more modified files to a classifier trained to generate an output indicating whether each of the one or more modified files is malicious or non-malicious
506 generating, based on the output and the metadata, performance data indicative of a performance of the classifier
508 adjusting, based on the performance data, one or more parameters of the classifier to improve the performance of the classifier to detect the group of attacks
510

ADVERSARIAL ATTACKS COMMON INTERFACE

TECHNICAL FIELD

The present disclosure relates generally to cyber security, and more particularly, to systems and methods of testing and adjusting a classifier to improve a performance of the classifier to detect a malicious file.

BACKGROUND

Cybersecurity is the practice of protecting critical systems and sensitive information from digital attacks. Cybersecurity techniques are designed to combat threats against networked systems and applications, whether those threats originate from inside or outside of an organization.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1 is a block diagram depicting an example environment for testing and adjusting a classifier to improve a performance of the classifier to detect a malicious file, according to some embodiments;

FIG. 4 is a flow diagram depicting a procedure of adjusting a classifier to improve a capability of a classifier to detect a malicious file, according to some embodiments;

FIG. 5 is a flow diagram depicting a method of testing and adjusting a classifier to improve a performance of the classifier to detect a malicious file, according to some embodiments.

DETAILED DESCRIPTION

Figures 2A, 2B:
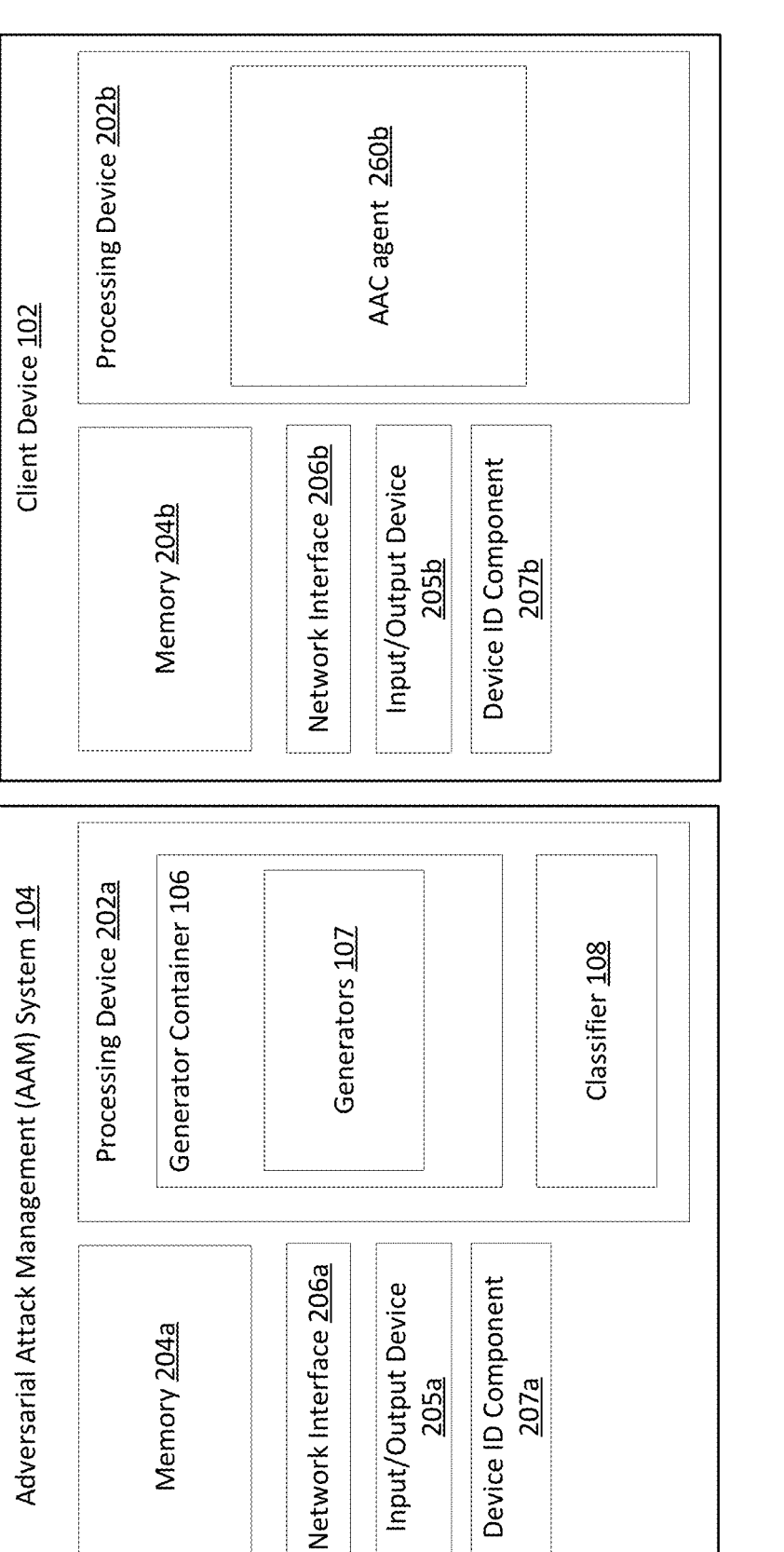
FIG. 2A is a block diagram depicting an example of the AAM system 104 of the environment in FIG. 1, according to some embodiments.
FIG. 2B is a block diagram depicting an example of the client device 102 of the environment in FIG. 1, according to some embodiments.

A machine learning model (sometimes referred to as, a classifier) may be trained to detect whether a file is malicious or non-malicious. However, significant, or even slight, modifications of the file content, structure, or optional fields and data can confuse the machine learning model (ML). For example, adding a clean overlay to a file, such as a portable executable (PE) file, could drastically change the decision capability of the ML model to detect whether the PE file is malicious. The conventional solution for testing adversarial attacks on a ML model is to collect several anti-virus software tools, but these anti-virus software tools are limited, they work in different environments, and present difficulties for automation. Thus, the ML models that are deployed into a production environment are often poorly tested, and as a result, easily break when ingesting modified files and/or fail to identify the modified file as being malicious.

The inherent flaws of the conventional ML model makes a computer more susceptible to malicious attacks when processing infected files/programs, which in turn, could allow an attacker to steal application data and/or excessively consume the computing resources (e.g., memory resources, power resources, processing resources, networking resources) of the computer, the communication network that is coupled to the computer, and/or other computers that are on the same communication network. Thus, there is a long-felt but unsolved need to solve the problems of providing a robust solution for testing and adjusting a classifier to improve a performance of the classifier to detect a malicious file.

Aspects of the present disclosure address the above-noted and other deficiencies by testing and adjusting a classifier to improve a performance of the classifier to detect a malicious file. Benefits of the embodiments of the present disclosure may include a protection against application data theft or protection against wastage of computing resources (e.g., memory resources, power resources, processing resources, networking resources) of computers on a communication network because of potential compromises otherwise.

As discussed in greater detail below, the embodiments of the present disclosure provide specific generators for a variety of different file formats. The generators use a common configuration scheme describing which attacks should be applied to which files to facilitate automation on large sets of files (e.g., millions of files). The generators provide a common interface for files of many different file types or file format; thereby allowing the generators to support the scale and deployment needs of large computing networks. New attacks can be implemented as "add-ons" to the existing generators. Attacks can also be combined on any specific file to create combinatorial variation in the output dataset.

In an illustrative embodiment, an adversarial attack management (AAM) system receives a request to process a target file. The AAM system generates, based on a configuration file and the target file, one or more modified files and metadata associated with the one or more modified files. The one or more modified files are configured to perform a group of attacks on a computing environment. The AAM system provides the one or more modified files to a classifier trained to generate an output indicating whether each of the one or more modified files is malicious or non-malicious. The AAM system generates, based on the output and the metadata, performance data indicative of a performance of the classifier. The AAM system adjusts, based on the performance data, one or more parameters of the classifier to improve the performance of the classifier to detect the group of attacks.

FIG. 1 is a block diagram depicting an example environment for testing and adjusting a classifier to improve a performance of the classifier to detect a malicious file, according to some embodiments. The environment 100 includes an adversarial attack management (AAM) system 104 and one or more client devices 102 that are communicably coupled together via a communication network 120. The AAM system 104 executes a classifier 108 that is trained to ingest one or more input files (e.g., modified files 105, target files 101) and generate a classifier output that indicates whether each of the one or more input files is malicious or non-malicious. The performance of the classifier 108 to detect a malicious file depends on parameters 109, which are locally stored (e.g., memory, hard drive, database) on the classifier 108. Parameters 109, in some embodiments, express the importance of different indicators extracted from the file in the classifier decision-indicators such as file capabilities, file integrity, relationships between different segments of the file, file metadata and the like. The structure and the exact nature of the parameters 109 can vary depending on the classification algorithm (e.g., decision trees, neural networks, regression classifiers, etc.), but nonetheless the parameters 109 can be adjusted to change the classifier decision in the desired direction. The parameters 109, combined with the data extracted from the file using a specific algorithm (mentioned above) form the basis of the classifier decision upon that file.

The AAM system 104 executes a generator container 106 (sometimes referred to as, common interface) that includes generators 107 (e.g., generator 107*a*, generator 107*b*, generator 107*c*, generator 107*d*, generator 107*e*, generator 107*f*). Each generator 107 may be configured to read (e.g., ingest) a target file 101 of a particular file type or file format, and parse the target file 101 into one or more sections. For example, the generator 107*a* may be configured to read and parse a PE file, the generator 107*b* may be configured to read and parse a PDF file, the generator 107*c* may be configured to read and parse a Mach-O file, the generator 107*d* may be configured to read and parse a Microsoft Office file, the generator 107*e* may be configured to read and parse a Executable and Linkable Format (ELF) file, and the generator 107*f* may be configured to read and parse a script file (e.g., HyperText Markup Language (HTML) file).

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

An AAM system 104 and client device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

An AAM system 104 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The AAM system 104 may use the same type or different types of virtual environments. For example, all of the AAM systems 104 may be VMs. In another example, all of the AAM systems 104 may be containers. In a further example, some of the AAM systems 104 may be VMs, other AAM systems 104 may be containers, and other AAM systems 104 may be computing devices (or groups of computing devices).

Still referring to FIG. 1, the AAM system 104 receives a request to process a target file 101, where the request includes a configuration file 103. The configuration file includes 1 list of attacks and attack rules for applying the attacks to the target file 101. The AAM system 104 modifies, based on the configuration file 103, the one or more sections of the target file 101 (or a copy of the target file 101) and reconstructs the modified sections and unmodified sections (if any) into one or more modified files 105. The AAM system 104 also generates metadata associated with the one or more modified files 105, where the metadata includes a list of attacks that were used to modify the target file 101 (or the copy of the target file 101), a list of attacks that were not used to modify the target file 101 (or the copy of the target file 101), and a list of sections of the target file 101 (or the copy of the target file 101) that were modified. The AAM system 104 provides the one or more modified files 105 to the classifier 108 to cause the classifier 108 to generate a classifier output indicating whether each of the one or more modified files 105 is malicious or non-malicious. The AAM system 104 generates, based on the classifier output and the metadata, classifier performance data (e.g., statistics) indicative of a performance of the classifier 108. The AAM system 104 adjusts, based on the classifier performance data, one or more parameters 109 of the classifier 108 to improve the performance of the classifier 108 to detect the group (e.g., one or more) of attacks.

Although FIG. 1 shows only a select number of computing devices (e.g., AAM system 104, client devices 102); the environment 100 may include any number of computing devices that are interconnected in any arrangement to facilitate the exchange of data between the computing devices.

FIG. 2A is a block diagram depicting an example of the AAM system 104 in FIG. 1, according to some embodiments. While various devices, interfaces, and logic with particular functionality are shown, it should be understood that the AAM system 104 includes any number of devices and/or components, interfaces, and logic for facilitating the functions described herein. For example, the activities of multiple devices may be combined as a single device and implemented on a same processing device (e.g., processing device 402*a*), as additional devices and/or components with additional functionality are included.

The AAM system 104 includes a processing device 202*a* (e.g., general purpose processor, a PLD, etc.), which may be composed of one or more processors, and a memory 204*a* (e.g., synchronous dynamic random-access memory (DRAM), read-only memory (ROM)), which may communicate with each other via a bus (not shown).

The processing device 202*a* may be provided by one or more general-purpose processing devices such as a microprocessor, central processing unit, or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the AAM system 104. In some embodiments, the processing device 202a and the memory 204a form various processing devices and/or circuits described with respect to the AAM 104. The instructions include code from any suitable computer programming language such as, but not limited to, C, C++, C#, Java, JavaScript, VBScript, Perl, HTML, XML, Python, TCL, and Basic.

The processing device 202 executes a generator container 106 and a classifier 108. The classifier 108 includes a local storage (e.g., memory, hard drive, database) to store parameters that control a performance of the classifier 108 to detect a malicious file. Parameters 109, in some embodiments, express the importance of different indicators extracted from the file in the classifier decision-indicators such as file capabilities, file integrity, relationships between different segments of the file, file metadata and the like. The structure and the exact nature of the parameters 109 can vary depending on the classification algorithm (e.g., decision trees, neural networks, regression classifiers, etc.), but nonetheless the parameters 109 can be adjusted to change the classifier decision in the desired direction. The parameters 109, combined with the data extracted from the file using a specific algorithm (mentioned above) form the basis of the classifier decision upon that file.

The generator container 106 includes generators 107 (e.g., generator 107a, generator 107b, generator 107c, generator 107d, generator 107e, generator 107f). Each generator 107 may be configured to read (e.g., ingest) a target file 101 of a particular file type or file format, and parse the target file 101 into one or more sections. For example, the generator 107a may be configured to read and parse a PE file, the generator 107b may be configured to read and parse a PDF file, the generator 107c may be configured to read and parse a Mach-O file, the generator 107d may be configured to read and parse a Microsoft Office file, the generator 107e may be configured to read and parse an ELF file, and the generator 107f may be configured to read and parse a script file (e.g., Hypertext Markup Language (HTML) file).

A target file 101 may be any type of digital file type or digital file format, for example, a picture file (e.g., a Joint Photographic Experts Group (JPEG), a Graphics Interchange Format (e.g., GIF)), an audio file (e.g., MP3), a video file (e.g., Moving Picture Experts Group (MPEG), MP4), a text file, a portable executable (PE), a portable document format (PDF) file, a Mach-O file (or Mach object file), a Microsoft Office file (e.g., a doc, xlsx, ppt), an Executable and Linkable Format (ELF) file, a script file (e.g., a text file that contains a sequence of debugger commands), and the like. A target file 101 may include one or more sections, where each section may be a title, a header, a body, a footer, an object (e.g., a table, a picture, object code, a data structure, an object class), a function, a declaration of variables or other programming elements, a comment, a trailer, a Boolean, a number, a name, a string, a page, or the like.

In some embodiments, the generator container 106 may be configured to receive a request to process a target file 101, where the request includes the target file 101 or a target file identifier. If the request includes the target file identifier, then the generator container 106 may use the target file identifier to retrieve the target file 101 from its memory (e.g., memory 202a), a local database, or a remote database.

In some embodiments, the request includes a configuration file 103 or a configuration file identifier. If the request includes the configuration file identifier, then the generator container 106 may use the configuration file identifier to retrieve the configuration file 103 from its memory (e.g., memory 202a), a local database, or a remote database. In some embodiments, the configuration file indicates a group of attacks and one or more attack rules (sometimes referred to as, generator mode) for modifying the target file 101 (or a copy of the target file 101) based on the group of attacks to generate the one or more modified files 105.

In some embodiments, the generator container 106 may generate the configuration file 103 based on the target file 101 and the selected generator 107. For example, the generator container 106 generates the configuration file by selecting, based on a file type of the target file, the group of attacks from a list of candidate attacks to apply to the target file. The generator container 106 may acquire the list of candidate attacks from its memory (e.g., memory 202a), a local database, or a remote database. In some embodiments, the request may include the list of candidate attacks.

In some embodiments, the generator container 106 may be configured to determine a file type or file format of the target file 101. In some embodiments, the generator container 106 may select, based on the file type of the target file 101, a particular generator 107 from the generators 107 and use the selected generator 107 to modify (e.g., alter, change) the target file 101 (or a copy of the target file 101). For example, if the target file 101 is a PE file, then the generator container 106 selects the generator (e.g., generator 107a) that is configured to read and parse a PE file. However, if the target file 101 is a PDF file, then the generator container 106 selects the generator (e.g., generator 107b) that is configured to read and parse a PDF file.

In some embodiments, the generator container 106 may be configured to modify, based on a configuration file 103, the target file 101 (or a copy of the target file 101) to generate one or more modified files 105 for performing a group of attacks on a computing environment (e.g., software resources, hardware resources) and metadata associated with the one or more modified files 105. In some embodiments, each of the one or more modified files 105 uniquely corresponds to one or more attacks of the group of attacks on the computing environment. In some embodiments, the generator container 106 makes a copy of the target file 101 and modifies the copy of the target file to generate the one or more modified files 105.

The metadata may indicate at least one of a list of attacks that were used to modify the target file 101, a list of attacks that were not used to modify the target file 101, or a list of sections of the target file 101 that were modified.

In some embodiments, the generator container 106 may be configured to modify, based on the configuration file 103, the target file 101 (or a copy of the target file 101) by parsing the target file 101 into a plurality of sections. The generator container 106 identifies a first group of sections of the plurality of sections to modify and a second group of sections of the plurality of sections to not modify. The generator container 106 modifies, based on the configuration file, each section of the first group of sections instead of modifying the second group of sections.

In some embodiments, the generator container 106 may be configured to modify, based on the configuration file 103, the target file 101 by determining that the one or more attack rules of the configuration file includes a first type (sometimes referred to as, "one_attack_per_file") of attack rule; and modifying, for each attack of the one or more attacks responsive to determining that the one or more attack rules of the configuration file includes the first type of attack rule, the target file based on the attack to generate a unique modified file of the one or more modified files. In some embodiments, a total number of the one or more modified files equals a total number of the one or more attacks. In other words, if the one_attack_per_file mode is selected, then the generator container 106 uses the attacks that are listed in the configuration file 103 to create a modified file for each attack. For example, if the configuration file 103 includes 4 attacks, then the generator container 106 will create 4 modified files.

In some embodiments, the generator container 106 may be configured to modify, based on the configuration file 103, the target file 101 (or a copy of the target file 101) by determining that the one or more attack rules includes a second type (sometimes referred to as, "combine_attack") of attack rule. The generator container 106 determines, based on the group of attacks responsive to determining that the one or more attack rules includes the second type of attack rule, a group of attack combinations, where each attack combination includes more than one attack of the group of attacks. The generator container 106 modifies, for each attack combination of the group of attack combinations, the target file 101 based on the attack combination to generate a unique modified file of the one or more modified files 105. In other words, if the combine_attack mode is selected, then the generator container 106 simultaneously applies all the attacks of the combination to the target file 101 to create 1 modified file.

For example, a configuration file 103 may include a list of attacks, such as attack 1, attack 2, attack 3, attack 4. The generator container 106 may generate a first modified file based on attack 1 and attack 2. The generator container 106 may generate a second modified file based on attack 1 and attack 3. The generator container 106 may generate a third modified file based on attack 1 and attack 4. The generator container 106 may generate a fourth modified file based on attack 2 and attack 3. The generator container 106 may generate a fifth modified file based on attack 2 and attack 4. The generator container 106 may generate a sixth modified file based on attack 3 and attack 4. The generator container 106 may generate a seventh modified file based on attack 1, attack 2, and attack 3. And so on.

In some embodiments, the generator container 106 may be configured to modify, based on the configuration file 103, the target file 101 (or a copy of the target file 101) by determining that the one or more attack rules includes a third type (sometimes referred to as, "specified_combination") of attack rule. Here, the configuration file 103 includes a list of attack combinations. The generator container 106 determines, based on the group of attacks responsive to determining that the one or more attack rules includes the third type of attack rule, a group of attack combinations, where each attack combination includes more than one attack of the group of attacks. The generator container 106 modifies, for each specified attack combination in the configuration file 103, the target file 101 based on the specified attack combination to generate a unique modified file of the one or more modified files 105. In other words, if the specified_attack mode is selected, then the generator container 106 creates a modified file for each specified attack combination.

In some embodiments, the generator container 106 may be configured to train, using training data, the classifier 108 to ingest one or more input files (e.g., modified files, target files) and generate a classifier output that indicates whether each of the one or more input files is malicious or non-malicious. The training data may include historical classifier outputs, target files, modified files, metadata (sometimes referred to as, attack metadata) associated with the modified files, and/or classifier performance data.

In some embodiments, the generator container 106 may be configured to provide one or more modified files 105 to the classifier 108 to cause the classifier 108 to generate a classifier output indicating whether each of the one or more modified files 105 is malicious or non-malicious. The generator container 106 provides the one or more modified files 105 to the classifier 108 by generating a message (shown in FIG. 1 as, input message) that includes the one or more modified files 105 and sends the input message to the classifier 108. A malicious file may be, for example, a program or file that is intentionally harmful to hardware resources (e.g., process, memory, storage, networking) and/or software resources (e.g., operating system, registry, a driver, an application) of a computer, a network, and/or server. A malicious file may be a computer virus, a worm, a Trojan horse, a ransomware, a spyware, or the like.

In some embodiments, the generator container 106 may be configured to generate, based on the classifier output and/or the metadata, classifier performance data that is indicative of a performance of the classifier 108. In some embodiments, the generator container 106 may be configured to adjust, based on the classifier performance data, one or more parameters 109 of the classifier 108 to improve the performance of the classifier 108 to detect the group of attacks. For example, the generator container 106 may generate, based on the classifier performance data, a set of parameters and include the set of parameters in a parameter message. The generator container 106 may send the parameter message to the classifier 108 to cause the classifier 108 to update its local storage of parameters 109 using the set of parameters in the parameter message.

In some embodiments, the generator container 106 may be configured to receive a second request to process a second target file 101. The generator container 106 may be configured to select, based on a file type of the second target file 101, a second generator (e.g., generator 107b) from the plurality of generators 107. In some embodiments, the file type of the first target file 101 (e.g., a PE file) may be different from the file type of the second target file 101 (e.g., a PDF file). In some embodiments, the generator container 106 may be configured to modify, based on the configuration file or a different configuration file, the second target file 101 to generate a second modified file for performing a second group of attacks on the computing environment. In some embodiments, the generator container 106 may be configured to provide the second modified file to the classifier 108 to generate a second output indicating whether the second modified file is malicious or non-malicious.

In some embodiments, the generator container 106 may be configured to provide, prior to modifying the target file 101, the target file 101 to the classifier 108 to cause the classifier 108 to generate a classifier output indicating that the target file 101 is a non-malicious file.

In some embodiments, the generator container 106 may be configured to determine, based on the classifier output, that the classifier 108 has identified a particular modified file of the one or more modified files 105 as being a non-malicious file. The generator container 106 may verify that adjusting the one or more parameters 109 of the classifier 108 improves the performance of the classifier 108 to detect the group of attacks by providing, after adjusting the one or more parameters 109 of the classifier 108, the particular modified file to the classifier 108 to cause the classifier 108 to generate a second classifier output indicating that the particular modified file is a malicious file. In other words, the adjustments to the parameters of the classifier 108 improved the capability of the classifier 108 to detect malicious files.

In some embodiments, the generator container 106 may be configured to transmit, to the client device 102, at least one of the classifier output of the classifier 108 or the classifier performance data indicative of the performance of the classifier 108.

The AAM system 104 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the host machine 115 includes a plurality of network interfaces 206a of different types, allowing for connections to a variety of networks, such as local area networks (public or private) or wide area networks including the Internet, via different sub-networks.

The AAM system 104 includes an input/output device 205a configured to receive user input from and provide information to a user. In this regard, the input/output device 205a is structured to exchange data, communications, instructions, etc. with an input/output component of the AAM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the AAM system 104, such as a built-in display, touch screen, microphone, etc., or external to the housing of the AAM system 104, such as a monitor connected to the AAM system 104, a speaker connected to the AAM system 104, etc., according to various embodiments. In some embodiments, the AAM system 104 includes communication circuitry for facilitating the exchange of data, values, messages, and the like between the input/output device 205a and the components of the AAM system 104. In some embodiments, the input/output device 205a includes machine-readable media for facilitating the exchange of information between the input/output device 205a and the components of the AAM system 104. In still another embodiment, the input/output device 205a includes any combination of hardware components (e.g., a touchscreen), communication circuitry, and machine-readable media.

The AAM system 104 includes a device identification component 207a (shown in FIG. 2A as device ID component 207a) configured to generate and/or manage a device identifier associated with the AAM system 104. The device identifier may include any type and form of identification used to distinguish the AAM system 104 from other computing devices. In some embodiments, to preserve privacy, the device identifier may be cryptographically generated, encrypted, or otherwise obfuscated by any device and/or component of the AAM system 104. In some embodiments, the AAM system 104 may include the device identifier in any communication (e.g., classifier performance data, input message, parameter message, etc.) that the AAM system 104 sends to a computing device.

The AAM system 104 includes a bus (not shown), such as an address/data bus or other communication mechanism for communicating information, which interconnects the devices and/or components of the AAM system 104, such as processing device 202a, network interface 206a, input/output device 205a, and device ID component 207a.

In some embodiments, some or all of the devices and/or components of host machine 115 may be implemented with the processing device 202a. For example, the AAM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the client device 102 of the environment in FIG. 1, according to some embodiments. While various devices, interfaces, and logic with particular functionality are shown, it should be understood that the host machine 115 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The client device 102 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 4a, but with respect to devices and/or components of the client device 102 instead of devices and/or components of the AAM system 104.

The memory 204b of processing device 202b stores data and/or computer instructions/code for facilitating at least some of the various processes described herein. The memory 204b includes identical or nearly identical functionality as memory 204a in FIG. 4A, but with respect to devices and/or components of the client device 102 instead of devices and/or components of the AAM system 104.

The processing device 202a may be configured to execute an Adversarial Attack Client (AAC) agent 260b that is configured to transmit a request (e.g., process request) to process a target file 101. In some embodiments, the request includes the target file 101 and/or a configuration file 103. In some embodiments, the AAC 260*b* may be configured to retrieve the target file 101 from a remote database.

In some embodiments, the AAC 260*b* may be configured to generate the configuration file 103 based on the target file 101, where the configuration file 103 includes a list of attacks and attack rules. For example, the client device 102 generates the configuration file by selecting, based on a file type of the target file, a group (or list) of attacks from a list of candidate attacks to apply to the target file. The generator container 106 may acquire the list of candidate attacks from its memory (e.g., memory 202*a*), a local database, or a remote database. In some embodiments, the request may include the list of candidate attacks.

The client device 102 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the client device 102 instead of devices and/or components of the AAM system 104.

The client device 102 includes an input/output device 205*b* configured to receive user input from and provide information to a user. In this regard, the input/output device 205*b* is structured to exchange data, communications, instructions, etc. with an input/output component of the host machine 115. The input/output device 205*b* includes identical or nearly identical functionality as input/output device 205*a* in FIG. 2A, but with respect to devices and/or components of the client device 102 instead of devices and/or components of the AAM system 104.

The client device 102 includes a device identification component 207*b* (shown in FIG. 2B as device ID component 207*b*) configured to generate and/or manage a device identifier associated with the client device 102. The device ID component 207*b* includes identical or nearly identical functionality as device ID component 207*a* in FIG. 2A, but with respect to devices and/or components of the client device 102 instead of devices and/or components of the AAM system 104.

The client device 102 includes a bus (not shown), such as an address/data bus or other communication mechanism for communicating information, which interconnects the devices and/or components of the client device 102, such as processing device 202*b*, network interface 206*b*, input/output device 205*b*, and device ID component 207*b*.

In some embodiments, some or all of the devices and/or components of the client device 102 may be implemented with the processing device 202*b*. For example, the client device 102 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 3:
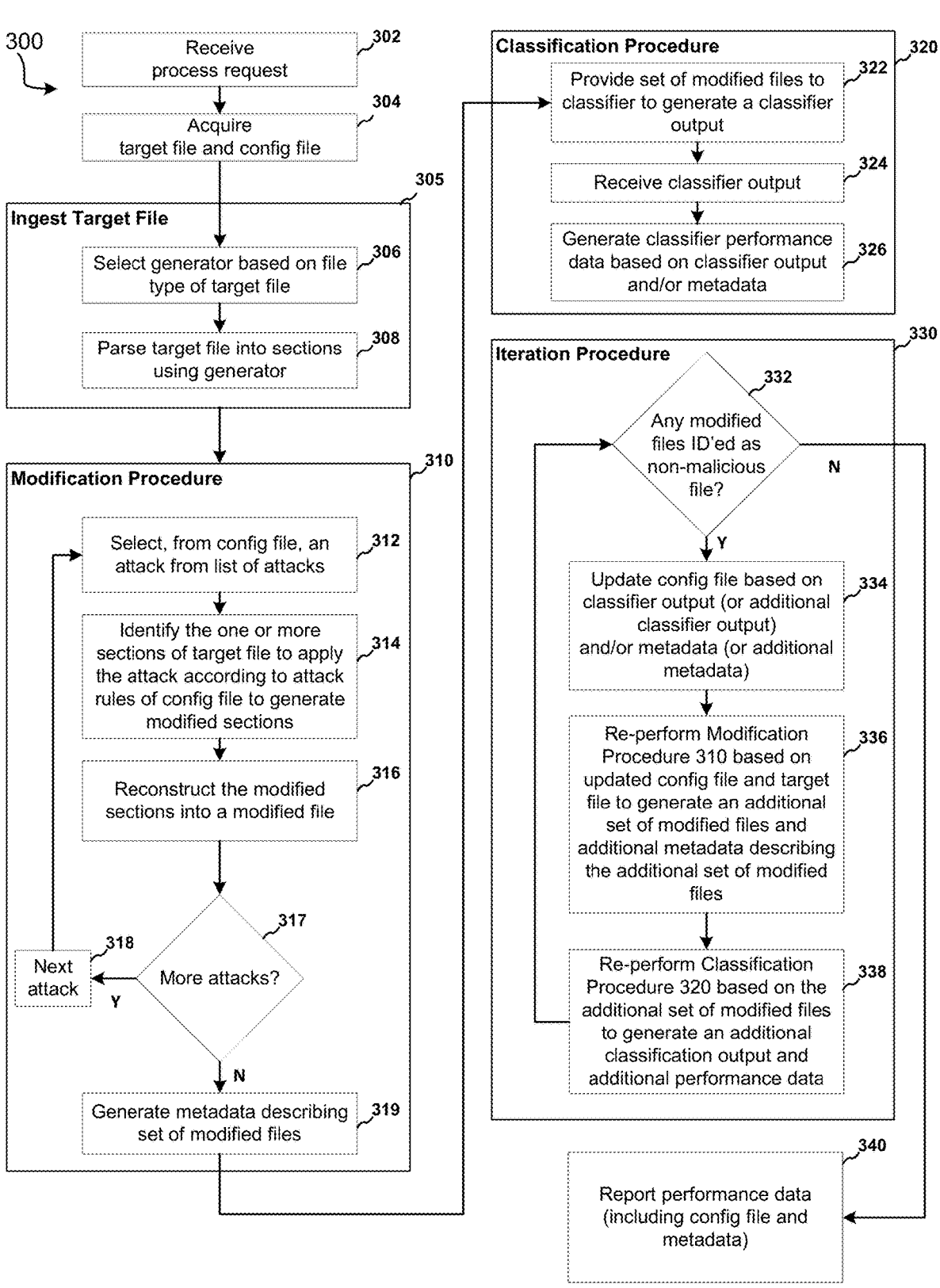
FIG. 3 is a flow diagram depicting a procedure of determining a capability of a classifier to detect a malicious file, according to some embodiments.

FIG. 3 is a flow diagram depicting a procedure of determining a capability of a classifier to detect a malicious file, according to some embodiments. Although specific function blocks ("blocks") are disclosed in procedure 300, such blocks are examples. That is, embodiments are well suited to performing various other blocks or variations of the blocks recited in procedure 300. It is appreciated that the blocks in procedure 300 may be performed in an order different than presented, and that not all of the blocks in procedure 300 may be performed.

The procedure 300 will be described with respect to FIG. 1. At block 302, the AAM system 104 receives a process request. At block 304, the AAM system 104 acquires a target file 101 and a configuration file 103 associated with the configuration file.

At block 305, the AAM system 104 ingests (e.g., reads, processes) a target file 101 according to blocks 306, 308. At block 306, the AAM system 104 selects a generator 107 from among the generators 107 based on a file type of the target file 101. At block 308, the AAM system 104 parses the target file into one or more sections using the selected generator 107.

At block 310, the AAM system 104 performs a Modification Procedure according to blocks 312, 314, 316, 317, 318, 319. At block 312, the AAM system 104 selects, from a configuration file, an attack from a list of attacks. At block 314, the AAM system 104 identifies the one or more sections of target file 101 to apply the attack according to attack rules of configuration file 103 to generate modified sections. At block 316, the AAM system 104 reconstructs the modified sections into a modified file. At block 317, the AAM system 104 checks if there are more attacks in the list of attacks to apply to the target file 101. If yes, then the AAM system 104 proceeds to block 318 to select the next attack from the list of attacks and then proceeds to block 312 to repeat. However, if the answer at block 317 is no, then the AAM system 104 proceeds to block 319 to generate metadata describing the set (e.g., one or more) of modified files 105.

At block 320, the AAM system 104 performs a classification procedure according to blocks 322, 324, 326. At block 322, the AAM system 104 provides the set of modified files 105 to the classifier 108 to generate a classifier output indicating whether each modified file of the set of modified files 105 is malicious or non-malicious. At block 324, the AAM system 104 receives the classifier output. At block 326, the AAM system 104 generates classifier performance data based on the classifier output and/or the metadata, where the performance data describes a capability (e.g., attack-detection strengths, attack-detection weaknesses) of the classifier 108 to detect a malicious file.

At block 330, the AAM system 104 performs an iteration procedure according to blocks 332, 334, 336, 338. At block 332, the AAM system 104 check whether the classifier 108 identifies any of the modified files as being non-malicious. If no, then the AAM system 104 proceeds to block 340 to report (e.g., send) performance data, the config file, the metadata to the client device 102. However, if the answer at block 332 is yes, then the AAM system 104 proceeds to block 334 to update the configuration file 103 based on the one or more classifier outputs.

At block 336, the AAM system 104 re-performs the Modification Procedure (at block 310 in FIG. 3) based on the updated configuration file 103 and the target file 101 to generate an additional set of modified files and additional metadata describing the additional set of modified files. At block 338, the AAM system 104 re-performs the Classification Procedure (at block 320 in FIG. 3) based on the additional set of modified files to generate an additional classification output and additional performance data. The AAM system 104 proceeds to block 332 to repeat.

FIG. 4 is a flow diagram depicting a procedure of adjusting a classifier to improve a capability of a classifier to detect a malicious file, according to some embodiments. Although specific function blocks ("blocks") are disclosed in procedure 400, such blocks are examples. That is, embodiments are well suited to performing various other blocks or variations of the blocks recited in procedure 400. It is appreciated that the blocks in procedure 400 may be performed in an order different than presented, and that not all of the blocks in procedure 400 may be performed.

The procedure 400 will be described with respect to FIG. 1. At block 402, the AAM system 104 receives a request to process a target file 101 and a configuration file 103. At block 405, the AAM system 104 ingests a file according to block 305 in FIG. 3.

At block 410, the AAM system 104 performs the Modification Procedure according to block 310 in FIG. 3.

At block 420, the AAM system 104 performs the Classification Procedure according to block 320 in FIG. 3.

At block 432, the AAM system 104 checks whether the classifier 108 identifies any of the modified files as being non-malicious. If no, then the AAM system 104 proceeds to block 440 to report (e.g., send) performance data, the config file, the metadata to the client device 102. However, if the answer at block 422 is yes, then the AAM system 104 proceeds to block 334 to adjust the classifier 108 based on the most-recent performance data.

At block 438, the AAM system 104 re-performs the Classification Procedure (at block 320 in FIG. 3) using the modified files and proceeds to block 432 to repeat.

FIG. 5 is a flow diagram depicting a method of testing and adjusting a classifier to improve a performance of the classifier to detect a malicious file, according to some embodiments. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 500 may be performed by an adversarial attack management (AAM) system, such as a AAM system 104 in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5, the method 500 includes the block 502 of receiving a request to process a target file. The method 500 includes the block 504 of generating, by a processing device based on a configuration file and the target file, one or more modified files and metadata associated with the one or more modified files, wherein the one or more modified files are configured to perform a group of attacks on a computing environment, wherein each of the one or more modified files uniquely corresponds to one or more attacks of the group of attacks. The method 500 includes the block 506 of providing the one or more modified files to a classifier trained to generate an output indicating whether each of the one or more modified files is malicious or non-malicious. The method 500 includes the block 508 of generating, based on the output and the metadata, classifier performance data indicative of a performance of the classifier. The method 500 includes the block 510 of adjusting, based on the classifier performance data, one or more parameters of the classifier to improve the performance of the classifier to detect the group of attacks.

Figure 6:
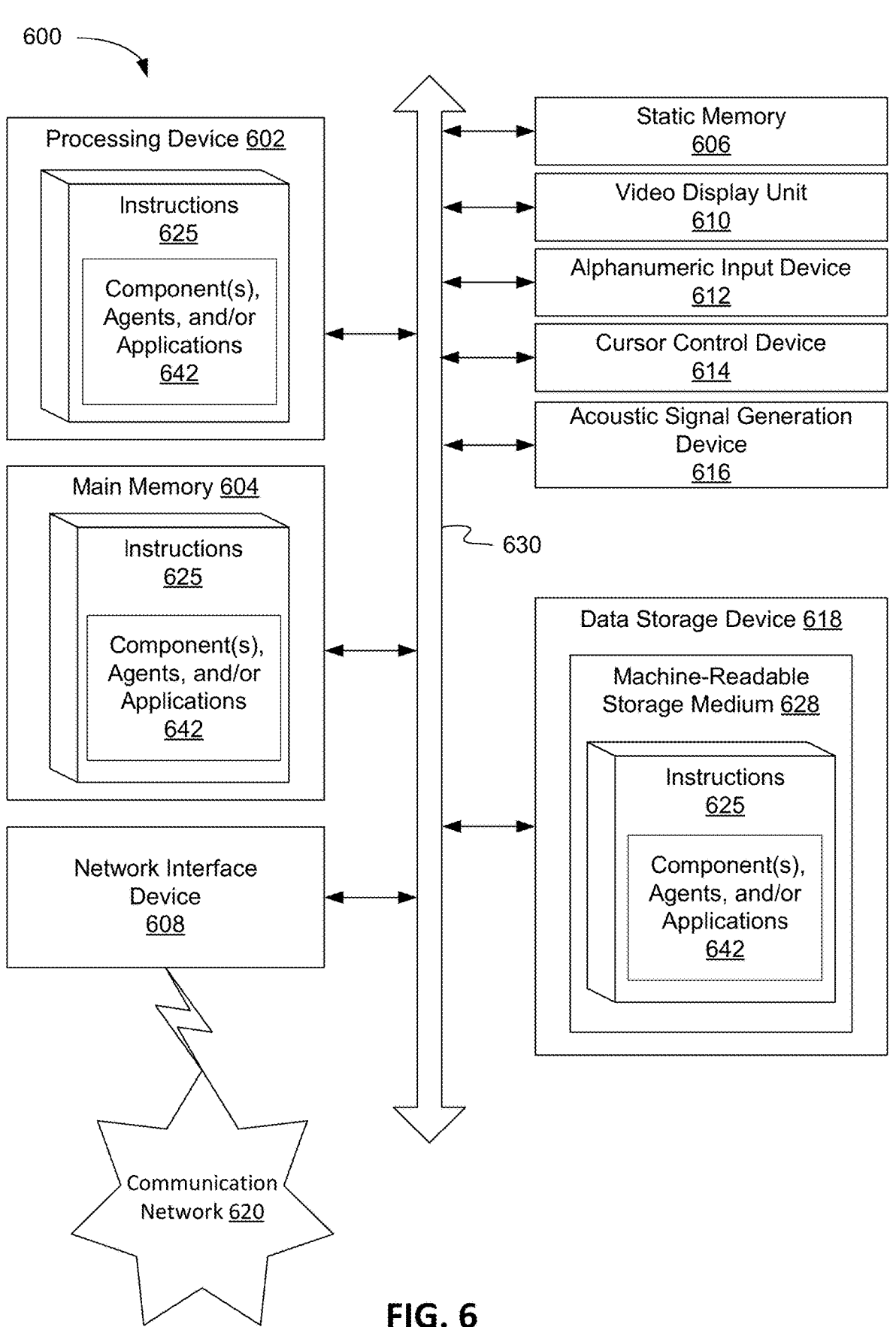
FIG. 6 is a block diagram of an example computing device 600 that may perform one or more of the operations described herein, in accordance with some embodiments.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a communication network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for one or more components/programs/applications 642 (e.g., generator container 106, classifier 108 in FIG. 2A, etc.) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a communication network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "modifying," "providing," "generating," "adjusting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:

receiving a request to process a target file;

generating, by a processing device based on a configuration file and the target file, a modified file and a list of attacks that were not used to modify the target file, wherein the modified file is configured to perform an attack on a computing environment;

providing the modified file to a classifier trained to generate an output indicating whether the modified file is malicious or non-malicious;

generating, based on the output and the list of attacks that were not used to modify the target file, performance data indicative of a performance of the classifier; and adjusting, based on the performance data, one or more parameters of the classifier to improve the performance of the classifier to detect the attack.

2. The method of claim 1, wherein generating, by the processing device based on the configuration file and the target file, the modified file further comprises:

parsing the target file into a plurality of sections;

identifying a first group of sections of the plurality of sections to modify and a second group of sections of the plurality of sections to not modify; and modifying, based on the configuration file, each section of the first group of sections.

3. The method of claim 1, further comprising:

determining a file type of the target file; and selecting, based on the file type of the target file, a first generator from a plurality of generators;

wherein generating, by the processing device based on the configuration file and the target file, the modified file is further based on the first generator.

4. The method of claim 3, further comprising:

receiving a second request to process a second target file;

selecting, based on a different file type of the second target file, a second generator from the plurality of generators;

modifying, based on the configuration file or a different configuration file, the second target file to generate a second modified file for performing a second attack on the computing environment; and providing the second modified file to the classifier to generate a second output indicating whether the second modified file is malicious or non-malicious.

5. The method of claim 1, further comprising:

transmitting, to a client device, at least one of the output of the classifier or the performance data indicative of the performance of the classifier.

6. The method of claim 1, wherein the configuration file indicates the attack and one or more attack rules for generating the modified file based on the attack.

7. The method of claim 6, wherein generating, by the processing device based on the configuration file and the target file, the modified file further comprises:

determining that the one or more attack rules of the configuration file comprises a first type of attack rule; and modifying, responsive to determining that the one or more attack rules of the configuration file comprises the first type of attack rule, the target file based on the attack to generate the modified file.

8. The method of claim 1, wherein the generating the performance data is further based on at least one of:

a list of attacks that were used to modify the target file, or a list of sections of the target file that were modified.

9. The method of claim 1, further comprising:

receiving the target file from a client device or retrieving the target file from a data storage; and providing, prior to modifying the target file, the target file to the classifier to cause the classifier to generate a second output indicating that the target file is a non-malicious file.

10. The method of claim 1, further comprising:

determining, based on the output, that the classifier has identified the modified file as being a non-malicious file; and verifying that adjusting the one or more parameters of the classifier improves the performance of the classifier to detect the attack by providing, after adjusting the one or more parameters of the classifier, the modified file to the classifier to cause the classifier to generate a second output indicating that the modified file is a malicious file.

11. A system comprising:

a memory; and a processing device, operatively coupled to the memory, to:

receive a request to process a target file;

generate, based on a configuration file and the target file, a modified file and a list of attacks that were not used to modify the target file, wherein the modified file is configured to perform an attack on a computing environment;

provide the modified file to a classifier trained to generate an output indicating whether the modified file is malicious or non-malicious;

generate, based on the output and the list of attacks that were not used to modify the target file, performance data indicative of a performance of the classifier; and adjust, based on the performance data, one or more parameters of the classifier to improve the performance of the classifier to detect the attack.

12. The system of claim 11, wherein to the processing device to:

parse the target file into a plurality of sections;

identify a first group of sections of the plurality of sections to modify and a second group of sections of the plurality of sections to not modify; and modify, based on the configuration file, each section of the first group of sections.

13. The system of claim 11, wherein the processing device to:

determine a file type of the target file; and select, based on the file type of the target file, a first generator from a plurality of generators;

wherein to generate, by the processing device based on the configuration file and the target file, the modified file is further based on the first generator.

14. The system of claim 13, wherein the processing device to:

receive a second request to process a second target file;

select, based on a different file type of the second target file, a second generator from the plurality of generators;

modify, based on the configuration file or a different configuration file, the second target file to generate a second modified file for performing a second attack on the computing environment; and provide the second modified file to the classifier to generate a second output indicating whether the second modified file is malicious or non-malicious.

15. The system of claim 11, wherein the configuration file indicates the attack and one or more attack rules for modifying the target file based on the attack to generate the modified file.

16. The system of claim 15, wherein the processing device to:

determine that the one or more attack rules of the configuration file comprises a first type of attack rule; and modify, responsive to determining that the one or more attack rules of the configuration file comprises the first type of attack rule, the target file based on the attack to generate the modified file.

17. The system of claim 11, wherein the processing device to:

receive the target file from a client device or retrieving the target file from a data storage;

provide, prior to modifying the target file, the target file to the classifier to cause the classifier to generate a second output indicating that the target file is a non-malicious file;

determine, based on the output, that the classifier has identified the modified file as being a second non-malicious file; and verify that adjusting the one or more parameters of the classifier improves the performance of the classifier to detect the attack by providing, after adjusting the one or more parameters of the classifier, the modified file to the classifier to cause the classifier to generate a third output indicating that the modified file is a malicious file.

18. A non-transitory computer-readable medium storing instructions that, when execute by a processing device, cause the processing device to:

receive a request to process a target file;

generate, by the processing device based on a configuration file and the target file, a modified file and a list of attacks that were not used to modify the target file, wherein the modified file is configured to perform an attack on a computing environment;

provide the modified file to a classifier trained to generate an output indicating whether the modified file is malicious or non-malicious;

generate, based on the output and the list of attacks that were not used to modify the target file, performance data indicative of a performance of the classifier; and adjust, based on the performance data, one or more parameters of the classifier to improve the performance of the classifier to detect the attack.

* * * * *